United States Patent
Cai

(10) Patent No.: US 11,677,278 B2
(45) Date of Patent: Jun. 13, 2023

(54) WIRELESS CHARGER

(71) Applicant: GUANGDONG OPPO MOBILE TELECOMMUNICATIONS CORP., LTD., Guangdong (CN)

(72) Inventor: Hongzhen Cai, Guangdong (CN)

(73) Assignee: GUANGDONG OPPO MOBILE TELECOMMUNICATIONS CORP., LTD., Dongguan (CN)

(*) Notice: Subject to any disclaimer, the term of this patent is extended or adjusted under 35 U.S.C. 154(b) by 175 days.

(21) Appl. No.: 17/072,506

(22) Filed: Oct. 16, 2020

(65) Prior Publication Data
US 2021/0126493 A1   Apr. 29, 2021

(30) Foreign Application Priority Data

Oct. 25, 2019 (CN) .......................... 201911026058.2

(51) Int. Cl.
*H02J 50/90* (2016.01)
*H02J 50/10* (2016.01)
(Continued)

(52) U.S. Cl.
CPC ............ *H02J 50/90* (2016.02); *H02J 7/0042* (2013.01); *H02J 50/005* (2020.01); *H02J 50/10* (2016.02)

(58) Field of Classification Search
CPC ..................................................... H02J 50/90
(Continued)

(56) References Cited

U.S. PATENT DOCUMENTS 8,519,666 B2 * 8/2013 Terao ...................... H02J 50/90
320/108
2012/0262002 A1   10/2012 Widmer et al.
(Continued)

FOREIGN PATENT DOCUMENTS

CN      103618350 A    3/2014
CN      205829229 U   12/2016
(Continued)

OTHER PUBLICATIONS

Extended European Search Report for EP Application 20198993.6 dated Jun. 16, 2021. (12 pages).
(Continued)

*Primary Examiner* — Edward Tso
*Assistant Examiner* — Ahmed H Omar
(74) *Attorney, Agent, or Firm* — Young Basile Hanlon & MacFarlane, P.C.

(57) ABSTRACT

A wireless charger is provided. The wiles charger includes a housing defining an opening hole. A lifting module is received in the housing and movable up and down in the housing. A translation module is disposed on the lifting module and capable of translating in the housing and movable up and down along with the lifting module. A charging module is arranged on the translation module, configured to charge a device to be charged, and capable of translating in the housing along with the translation of the charging module. A connecting module is disposed on the lifting module, arranged correspondingly to the opening hole, and configured to be connected to the device to be charged. The lifting module is capable of driving the connecting module to move up and down and be further exposed out of the housing from the opening hole.

20 Claims, 12 Drawing Sheets

(51) Int. Cl.
*H02J 50/00* (2016.01)
*H02J 7/00* (2006.01)

(58) Field of Classification Search
USPC .......................................................... 320/108
See application file for complete search history.

(56) References Cited

U.S. PATENT DOCUMENTS

| | | | |
|---|---|---|---|
| 2013/0113423 | A1 | 5/2013 | Baarman et al. |
| 2017/0080815 | A1* | 3/2017 | Wechsler ............ H02J 7/00034 |
| 2018/0224909 | A1 | 8/2018 | Koo et al. |

FOREIGN PATENT DOCUMENTS

| | | | | |
|---|---|---|---|---|
| CN | 108377040 | A | | 8/2018 |
| CN | 109104002 | A | | 12/2018 |
| CN | 208508575 | U | | 2/2019 |
| CN | 208522509 | U | | 2/2019 |
| CN | 208908373 | | * | 5/2019 .............. H02J 50/90 |
| CN | 208908373 | U | | 5/2019 |
| CN | 110053499 | A | | 7/2019 |
| CN | 209389789 | U | | 9/2019 |
| CN | 110829628 | A | | 2/2020 |
| CN | 210608807 | U | | 5/2020 |
| CN | 211089163 | U | | 7/2020 |
| CN | 211371227 | U | | 8/2020 |
| EP | 3151365 | A1 | | 4/2017 |
| EP | 3163590 | B1 | | 6/2018 |
| KR | 20190026559 | A | | 3/2019 |

OTHER PUBLICATIONS

Indian Examination Report for IN Application 202014046228 dated Jul. 30, 2021. (5 pages).
International Search Report for PCT/CN2020/122071 dated Jan. 18, 2021 (8 pages).
European partial search report EP20198993.6 dated Mar. 12, 2021 (13 pages).
Chinese First Office Action with English Translation for CN Application 201911026058.2 dated Mar. 21, 2023. (22 pages).

* cited by examiner

WIRELESS CHARGER

CROSS-REFERENCE TO RELATED APPLICATION(S)

This application claims priority to Chinese Patent Application No. 201911026058.2, filed on Oct. 25, 2019, the content of which is herein incorporated by reference in its entirety.

TECHNICAL FIELD

The described embodiments relates to the field of electrical appliances, and in particular, to a wireless charger.

BACKGROUND

Wireless charging technology is developed from wireless power transmission technology, and may be divided into two types: low-power wireless charging and high-power wireless charging. For the wireless charging, a power may be transmitted between a charger and a device to be charged by utilizing a magnetic field, and thus there is no need to use a wire to connect the charger and the device.

At present, most of wireless chargers available in the market have a transmitting coil, and the device to be charged has a receiving coil. When the device is charged by means of wireless charging, the transmitting coil of the wireless charger is aligned with the receiving coil of the device, to ensure the success of charging.

However, when a user places the device on the wireless charger, the receiving coil of the device is usually deviated or offset from the transmitting coil of the wireless charger. In this case, due to the decrease in the coupling degree of the transmitting coil and the receiving coil, a transmission efficiency of electromagnetic energy decreases. The situations that the wireless charger fails to charge or the charging cannot be achieved due to failure of triggering will occur.

SUMMARY

In some aspects, a wireless charger is provided. The wireless charger comprises: a housing, defining an opening hole; a lifting module, received in the housing and movable up and down in the housing; a translation module, disposed on the lifting module and capable of translating in the housing and movable up and down along with the lifting module; a charging module, arranged on the translation module, configured to charge a device to be charged, and capable of translating in the housing along with the translation of the charging module; and a connecting module, disposed on the lifting module, arranged correspondingly to the opening hole, and configured to be connected to the device to be charged, wherein the lifting module is capable of driving the connecting module to move up and down and be further exposed out of the housing from the opening hole.

In some aspects, another wireless charger is disclosed. The wireless charger includes: a housing, defining an opening hole; a lifting module, received in the housing and movable up and down in the housing; a translation module, disposed on the lifting module and capable of translating in the housing and movable up and down along with the lifting module; a charging module, arranged on the translation module, configured to charge a device to be charged, and capable of translating in the housing along with the translation of the charging module; and a connecting module, disposed on the lifting module, located at one side of the charging module facing away from the translation module, arranged correspondingly to the opening hole, and configured to be connected to the device to be charged, wherein the lifting module is capable of driving the connecting module to move up and down and be further exposed out of the housing from the opening hole.

In some aspects, another wireless charger is disclosed. The wireless charger includes: a housing, defining an opening hole; a lifting module, received in the housing and movable up and down in the housing; a connecting module, disposed on the lifting module, arranged correspondingly to the opening hole, and configured to be connected to the device to be charged, wherein the connecting module is movable between a first position in which the connecting module is exposed out of the housing via the opening hole and configured to be connected to the device to be charged and a second position in which the connecting module is received in the housing; a translation module, disposed on the lifting module, spaced apart from the connecting module, and capable of translating in the housing and movable up and down along with the lifting module; and a charging module, arranged on the translation module, configured to charge a device to be charged and capable of translating in the housing along with the translation of the charging module.

Figure 1:
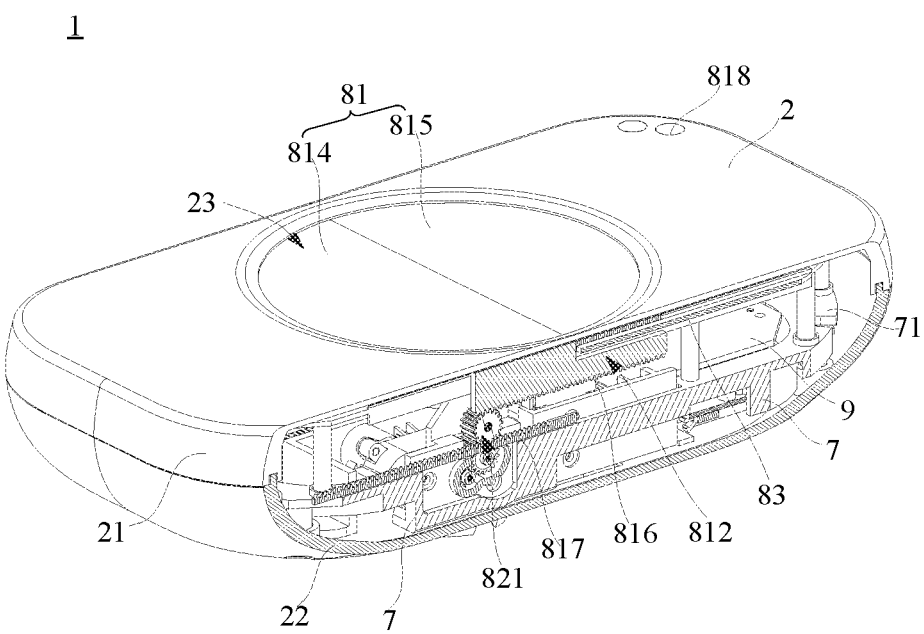
FIG. 1 is a cross-sectional view of a wireless charger according to some embodiments of the present disclosure.

The reference numbers are listed as follows.

1, wireless charger;
2, housing; 21, upper shell; 211, outer surface of upper shell; 22, lower shell; 23, opening hole; 24, connecting portion; 25, notch;
3, lifting module; 31, lifting bracket; 311, guiding element; 313, guiding groove; 32, driving assembly for lifting; 321, lifting rack; 322, deceleration mechanism for lifting; 33, raising switch;
4, translation module; 41, translation bracket; 411, supporting plate for translation; 412, protruding slider; 42, driving assembly for translation; 421, translation rack; 422, deceleration mechanism for translation; 43, linear bearing; 44, shaft; 45, first translation switch; 46, second translation switch;
5, charging module; 51, charging coil; 52, charging circuit;
6, connecting module; 61, bearing bracket; 611, recess; 62, adhesive layer;
7, frame; 71, protruding edge; 72, guiding rail;
8, dustproof module; 81, dustproof door; 811, panel; 812, connecting plate; 814, first dustproof sub-door; 815, second dustproof sub-door; 816, first rack; 817, second rack; 818, sensing switch; 82, driving assembly for dustproof door; 821, deceleration mechanism for dustproof door; 83, supporting plate; 831, supporting post; 85, motion chamber;
9, main board; 10, plug;
100, reduction gearbox; 110, box body; 111, upper box body; 112, lower box body; 113, opening; 120, gear; 121, first-stage gear; 122, second-stage gear; 123, third-stage gear; 124, output gear; 130, gear shaft; 131, first-stage shaft; 132, second-stage shaft; 133, output shaft; 140, motor gear; 150, motor;
200, device to be charged.

DETAILED DESCRIPTION

Although the present disclosure may be easily expressed as different forms of implementations, however, only some of the specific implementations are shown in the drawings and will be described in detail in the present specification. It may be understood that the embodiments of the present specification should be regarded as an example description of principles of the present disclosure, and are not intended to limit the present disclosure.

Thus, one feature indicated in this specification will be configured to describe one of the features of one embodiment of the present disclosure, rather than implying that each embodiment of the present disclosure must have the described feature. In addition, it should be noted that this specification describes many features. Although some features may be combined to show possible system designs, however, these features may also be used in other combinations that are not explicitly described in some embodiments of the present disclosure. Thus, unless stated otherwise, the combinations described in some embodiments of the present disclosure are not intended to be limiting.

Example embodiments will now be described more fully with reference to the drawings. However, the example embodiments may be implemented in various forms and should not be construed as being limited to the examples set forth herein. On the contrary, providing these example embodiments makes the description of the present disclosure more comprehensive and complete, and the designing idea of the example embodiments may be fully transferred to those skilled in the art. The drawings are only schematic illustrations of the present disclosure and are not necessarily drawn to scale. The same reference numerals in the drawings denote the same or similar components, and thus the repeated description will be omitted.

Furthermore, the described features, structures, or characteristics may be combined in one or more example embodiments in any suitable manner. In the following description, many specific details may be provided to give a sufficient understanding of the example embodiments of the present disclosure. However, those skilled in the art will realize that the technical solutions of the present disclosure may be practiced while omitting one or more of the specific details, or other methods, components, steps, and the like, may be adopted. In other instances, well-known structures, methods, implementations, or operations are not shown or described in detail to avoid obscuring the subject and obscuring aspects of the present disclosure.

Some block diagrams shown in the drawings may be functional entities and do not necessarily have to physically or logically correspond to independent entities. These functional entities may be implemented in form of software, implemented in one or more hardware modules or integrated circuits, or implemented in different networks and/or processor devices and/or microcontroller devices.

Some embodiments of the present disclosure will be further elaborated below in conjunction with the drawings of the present disclosure.

In some aspects, a wireless charger is provided. The wireless charger comprises: a housing, defining an opening hole; a lifting module, received in the housing and movable up and down in the housing; a translation module, disposed on the lifting module and capable of translating in the housing and movable up and down along with the lifting module; a charging module, arranged on the translation module, configured to charge a device to be charged, and capable of translating in the housing along with the translation of the charging module; and a connecting module, disposed on the lifting module, arranged correspondingly to the opening hole, and configured to be connected to the device to be charged, wherein the lifting module is capable of driving the connecting module to move up and down and be further exposed out of the housing from the opening hole.

In some embodiments, the lifting module comprises: a lifting bracket, configured to carry the charging module and the connecting module; and a first driving assembly, disposed on an outer periphery of the lifting bracket, connected to the lifting bracket, and configured to drive the lifting bracket to move up and down.

In some embodiments, the first driving assembly comprises: a lifting rack, connected to the lifting bracket; and a first deceleration mechanism for lifting, having an output gear movable up and down along the lifting rack and configured to drive the lifting bracket to move up and down.

In some embodiments, the lifting bracket further comprises a guiding element, and the guiding element is disposed on the outer periphery of the lifting bracket and spaced apart from the first driving assembly; the wireless charger further comprises a frame, the frame has an inner sidewall, a guiding rail is disposed on the inner sidewall of the frame, and the guiding element is cooperatively connected to the guiding element and movable along the guiding rail.

In some embodiments, the guiding element is a convex rib, the guiding rail is a sliding groove cooperating with the convex rib, and the convex rib is slidable along the sliding groove.

In some embodiments, the lifting module comprises a raising switch; when the lifting module raises to a preset position, the raising switch is triggered to control the lifting module to stop raising up.

In some embodiments, the connecting module comprises: a bearing bracket, having a bottom and a top opposite to the bottom; wherein the bottom of the bearing bracket is disposed on the lifting module; and an adhesive layer, disposed on the top and configured to fix the device to be charged.

In some embodiments, the translation module comprises: a translation bracket, configured to support the charging module; and a second driving assembly, connected to the translation bracket and configured to drive the translation bracket to translate.

In some embodiments, the second driving assembly comprises: a translation rack; and a second deceleration mechanism for translation, connected to the translation bracket, having an output gear movable along the translation rack, and configured to drive the translation bracket to translate.

In some embodiments, the translation rack extends along a lengthwise direction of the housing.

In some embodiments, the second driving assembly further comprises: a linear bearing, wherein the translation bracket is fixedly arranged on the linear bearing; and a shaft, wherein the linear bearing is slidably sleeved on the shaft, the shaft has an axial direction the same as an axial direction of the translation rack, and both ends of the shaft are fixed to the lifting bracket.

In some embodiments, the translation bracket comprises a first supporting plate for translation, wherein the first supporting plate for translation is configured to carry the charging module, and the linear bearing and the second deceleration mechanism for translation is fixedly disposed on a side face of the first supporting plate for translation opposite to the charging module.

In some embodiments, a protruding slider is disposed on the first supporting plate for translation, and the protruding slider is slidably connected to the lifting module to support the first supporting plate for translation.

In some embodiments, the second driving assembly for translation further comprises a first translation switch and a second translation switch, the first translation switch and the second translation switch are located at two opposite ends of a translation path of the translation bracket, respectively. When the translation bracket moves to one of two opposite ends of the translation path, the first translation switch or the second translation switch is configured to control the second driving assembly for translation to stop driving the translation bracket to move.

In some embodiments, the charging module comprises a charging coil and a charging circuit; the charging coil is electrically connected to the charging circuit.

In some embodiments, the wireless charger further comprises a dustproof module, wherein the dustproof module is disposed correspondingly to the opening hole of the housing. The dustproof module comprises a dustproof door and a third driving assembly for the dustproof door, the third driving assembly for the dustproof door is connected to the dustproof door and configured to drive the dustproof door to move so as to open or close the opening hole.

In some embodiments, the dustproof door comprises a pair of panels disposed opposite to each other, and the pair of panels are movable away from each other or towards each other to open or close the opening hole.

In some embodiments, the dustproof module comprises a second supporting plate, the second supporting plate is received in the housing, the second supporting plate and an inner sidewall of the housing cooperatively define a motion chamber, the dustproof door is movable within the motion chamber, and the supporting plate is configured to support the dustproof door.

In some embodiments, the third driving assembly for the dustproof door comprises a third deceleration mechanism for the dustproof door, and the dustproof door comprises a panel and a connecting plate vertically disposed at one side of the panel. The third deceleration mechanism for the dustproof door is connected to the connecting plate and configured to drive the panel to move so as to open or close the opening hole.

In some embodiments, the number of the dustproof doors are two, and the two dustproof doors comprise a first dustproof sub-door and a second dustproof sub-door, and each of the first dustproof sub-door and the second dustproof sub-door comprises a panel and a connecting plate; the panel is movable to open or close the opening hole, and the connecting plate is vertically disposed at one side of the panel. A first rack is disposed on the connecting plate of the first dustproof sub-door, a second rack is disposed on the connecting plate of the second dustproof sub-door, the second rack extends to be disposed opposite to the first rack, and an output gear of the third deceleration mechanism for the dustproof door is engaged with both the first rack and the second rack. The output gear of the third deceleration mechanism is rotatable to drive the first rack and the second rack to move towards or away from each other.

In some embodiments, the dustproof module further comprises a sensing switch configured to sense whether the device to be charged is placed on the housing, and the sensing switch is electrically connected to the third driving assembly for the dustproof door. When the sensing switch senses the device to be charged, the sensing switch is capable of actuating the third driving assembly for the dustproof door to drive the dustproof door to open the opening hole.

In some embodiments, the wireless charger further comprises a main board, wherein the translation module, the lifting module, and the dustproof module are electrically connected to the main board.

In some embodiments, the lifting module comprises a first reduction gearbox for lifting, and the translation module comprises a second reduction gearbox for translation. Each of the first reduction box for lifting and the second reduction gearbox for translation comprises a box body, a plurality of gears, and a plurality of gear shafts. The plurality of gears and the plurality of gear shafts are disposed in the box body, and at least two of the plurality of gears are located on the same gear shaft.

In some embodiments, the plurality of gears comprises an input gear and an output gear, the input gear is configured to connect to a motor gear, the output gear is connected to the input gear via the remaining of the plurality of gears, and the output gear is exposed outside the box body.

In some embodiments, a connection portion is disposed on an outer side of the housing, and the connection portion is configured for detachable connection with an external support.

In some embodiments, the connecting portion is a hollow stud, and the stud defines a notch.

In some aspects, another wireless charger is disclosed. The wireless charger includes: a housing, defining an opening hole; a lifting module, received in the housing and movable up and down in the housing; a translation module, disposed on the lifting module and capable of translating in the housing and movable up and down along with the lifting module; a charging module, arranged on the translation module, configured to charge a device to be charged, and capable of translating in the housing along with the translation of the charging module; and a connecting module, disposed on the lifting module, located at one side of the charging module facing away from the translation module, arranged correspondingly to the opening hole, and configured to be connected to the device to be charged, wherein the lifting module is capable of driving the connecting module to move up and down and be further exposed out of the housing from the opening hole.

In some aspects, another wireless charger is disclosed. The wireless charger includes: a housing, defining an opening hole; a lifting module, received in the housing and movable up and down in the housing; a connecting module, disposed on the lifting module, arranged correspondingly to the opening hole, and configured to be connected to the device to be charged, wherein the connecting module is movable between a first position in which the connecting module is exposed out of the housing via the opening hole and configured to be connected to the device to be charged and a second position in which the connecting module is received in the housing; a translation module, disposed on the lifting module, spaced apart from the connecting module, and capable of translating in the housing and movable up and down along with the lifting module; and a charging module, arranged on the translation module, configured to charge a device to be charged and capable of translating in the housing along with the translation of the charging module.

In some embodiments of the present disclosure, a wireless charger may be provided. The wireless charger may be configured to wirelessly charge a device to be charged. The device to be charged may be an electronic device such as a smart mobile terminal, a mobile power supply, an electric car, a notebook computer, an unmanned aerial vehicle, an e-book, an electronic cigarette, a smart wearable device, a cleaning robot, a Bluetooth speaker, an electric toothbrush, a rechargeable wireless mouse, and the like. The object which may be charged by the wireless charger may be not limited here, as long as the electronic device has a rechargeable battery and may realize wireless charging. For convenience of explanation, the device to be charged may be described by taking a mobile phone as an example, and the receiving coil for wireless charging may be located at a center point of the mobile phone.

Figure 2:
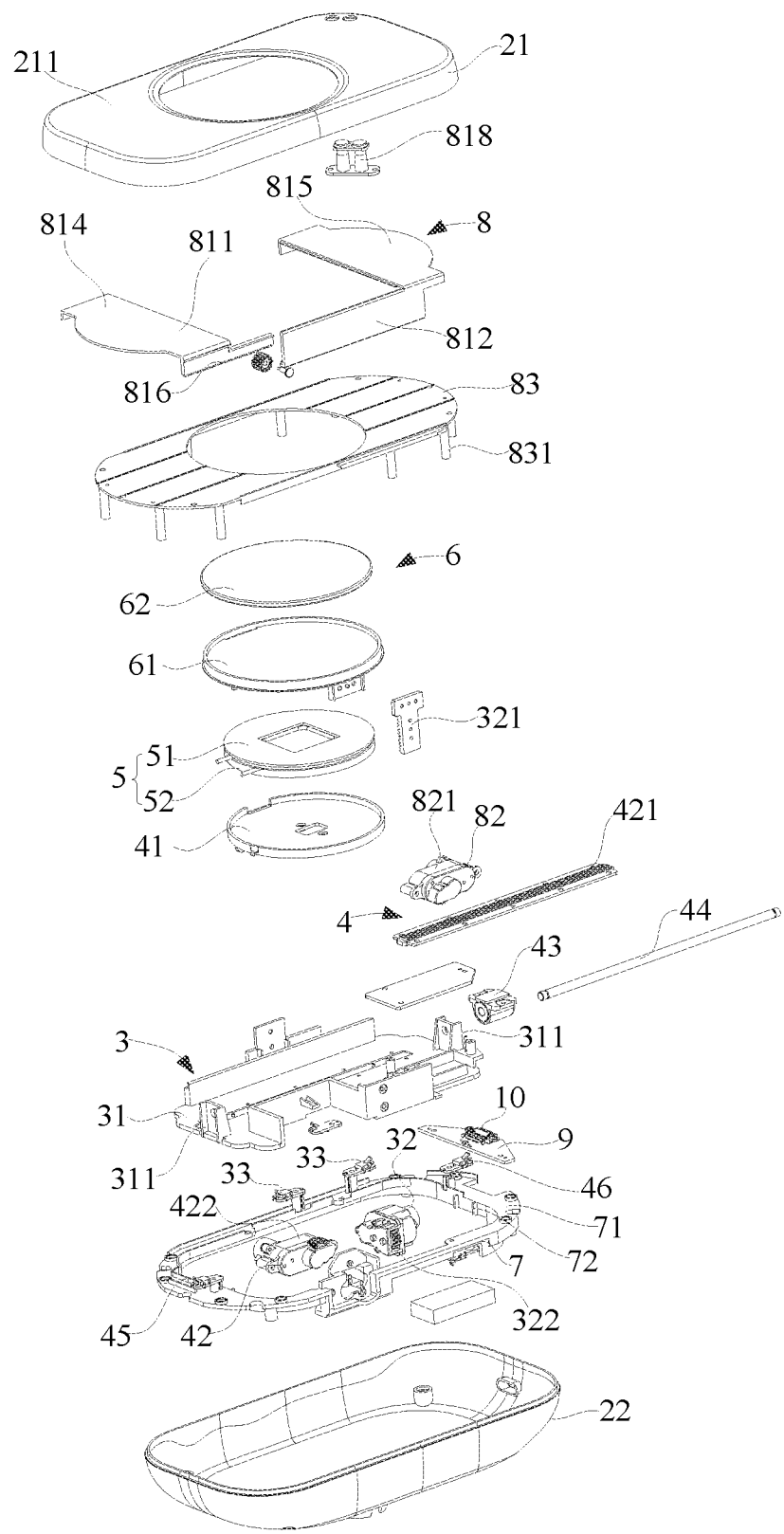
FIG. 2 is an exploded view of the wireless charger shown in FIG. 1.

More specifically, in some embodiments, as shown in FIGS. 1 and 2, the wireless charger 1 may include a housing 2, a lifting module 3, a translation module 4, a charging module 5, and a connecting module 6. The charging module 5 may be configured to charge the device to be charged. In some embodiments, the lifting module 3, the translation module 4, the charging module 5, and the connecting module 6 may be received in the housing 2. The lifting module 3 may be movable upwardly and downwardly in the housing 2. The translation module 4 may be translated/displaced/moved in the housing 2 and moved upwardly and downwardly (or raised up and lowered down) along with the lifting module 3. The charging module 5 may be arranged on and more specifically fixed on the translation module 4. The translation module 4 may be configured to drive the charging module 5 to translate or displace in the housing 2. The translation module 4 may be arranged on the lifting module 3. The lifting module 3 may be configured to drive the translation module 4 to move upwardly and downwardly. The connecting module 6 may be disposed on the lifting module 3. The connecting module 6 may be located at one side of the charging module 5 facing away from the translation module 4, and configured to connect to the device to be charged.

When the device needs to be charged, the lifting module 3 may lift or raise up the connecting module 6, such that the connecting module 6 may pass through the housing 2 and be exposed out of housing 2, in order to facilitate the connection between the device 200 and the connecting module 6. When the lifting module 3 raises or lifts up, the charging module 5 may also be driven to raise or lift up. In this way, it is possible to shorten a distance between the charging module 5 and the device 200, and further ensure that the distance between the charging module 5 and the device 200 may meet the requirements of a minimum coupling distance. In addition, the translation module 4 may drive the charging module 5 to translate or displace or shift in the housing 2. During the translation of the translation module 4, the charging module 5 may be aligned with the charging coil of the device 200, so as to ensure that the wireless charger 1 has a higher charging efficiency.

Moreover, after finishing the charging, the lifting module 3 may be descended or lowered down, thereby driving the connecting module 6, the translation module 4, and the charging module 5 to descend or lower down. The connecting module 6 may be retracted into the housing 2 from an opening hole 23 of the housing 2, and the wireless charger 1 may be in a stored state. The wireless charger 1 in the stored state may have a small volume, may be convenient for storage, and the connecting module 6 may be protected when the wireless charger 1 is in the stored state.

The housing 2 may have a flat round structure or a rectangular structure. The housing 2 may be small in size, light in weight, and easy to use. In addition, the housing 2 needs to meet certain waterproof requirements to improve the performance and safety of the wireless charger 1. Furthermore, when the device to be charged is a mobile phone, a longitudinal direction of the housing 2 may correspond to a longitudinal direction of the mobile phone, and a width direction of the housing 2 may correspond to a width direction of the mobile phone. Besides, the width of the housing 2 may be substantially equal to the width of the mobile phone.

More specifically, in some embodiments, the housing 2 may include an upper shell 21 and a lower shell 22. The upper shell 21 may be engaged with the lower shell 22 to form a cavity. In some embodiments, the lifting module 3, the translation module 4, the charging module 5, and the connecting module 6 may be received in the cavity formed by the upper shell 21 and the lower shell 22. The upper shell 21 may define the opening hole 23 as previously described. The opening hole 23 may be a circular through hole. A shape of the opening hole 23 may match with or adapt to a shape of the connecting module 6.

Figure 3:
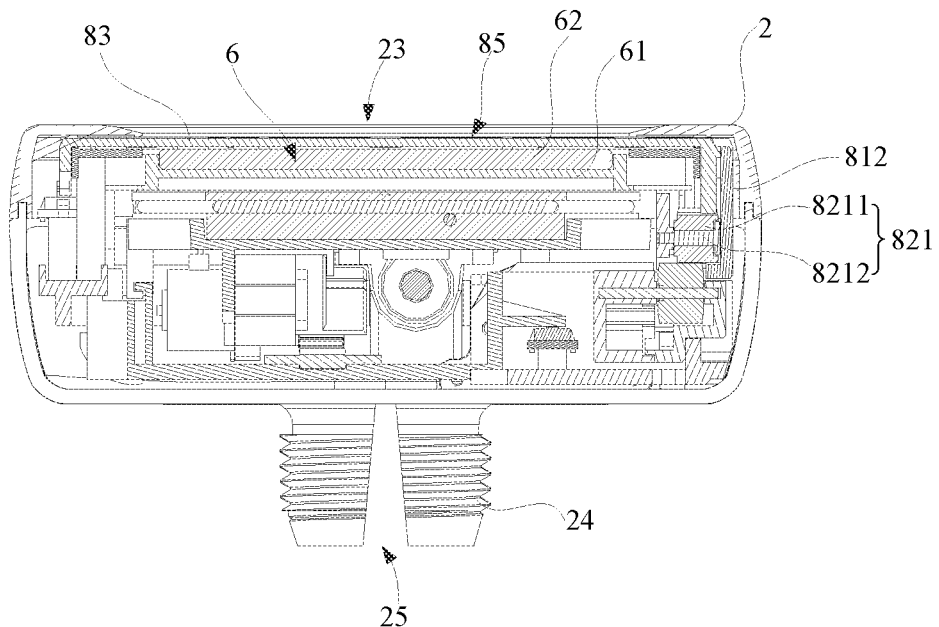
FIG. 3 is another cross-sectional view of the wireless charger shown in FIG. 1 viewing from another aspect.

As shown in FIG. 3, a connecting portion 24 may be disposed on an outer side of the housing 2. The connecting portion 24 may be configured for detachable connection with an external support. More specifically, in some embodiments, the connection portion 24 may be connected to the lower shell 22 and further extend away from the upper shell 21. The wireless charger 1 may be a car charger, and the connecting portion 24 may facilitate the connection of the wireless charger 1 to the car. The connecting portion 24 may be a buckle, a plug, a pin, or the like.

More specifically, in some embodiments, the connecting portion 24 may be a hollow stud or bolt or post. The hollow stud may be screwed with a screw hole of the car to achieve the fixing the wireless charger 1. Moreover, the hollow stud may define a notch 25. The notch 25 may change a radial size of the hollow stud, such that the hollow stud may be connected to the screw hole more securely.

The wireless charger 1 may further include a frame 7. The frame 7 may be located in the lower shell 22. The frame 7 may be configured to carry or bear the lifting module 3, the translation module 4, the charging module 5, or the connecting module 6. The frame 7 may be substantially annular. The frame 7 may have a shape adapted to or matching with that of the lower shell 22, such that the frame 7 may be received at a bottom of the lower shell 22. A protruding edge 71 may protrude from the frame 7 and toward an outer side of the annulus (that is, the frame 7). Moreover, the protruding edge 71 may substantially vertically protrude from an annular outer sidewall of the frame 7 and away from a center of the frame 7, and the protruding edge 71 may be configured to facilitate the arrangement of the frame 7.

The opening hole 23 defined in the housing 2 may be configured for the connecting module 6 to run therethrough. The connecting module 6 may be disposed opposite to or corresponding to or aligned with the opening hole 23 of the housing 2. The lifting module 3 may drive the connecting module 6 to lift or move up and down, such that the connecting module 6 may pass or extend through the opening 23 the connecting module 6 is in use, the lifting module 3 may drive the connecting module 6 to raise up and be further exposed out of the housing 2 via the opening hole 23. When the connecting module 6 is not in use, the connecting module 6 may be retracted into the housing 2.

More specifically, in some embodiments, the wireless charger 1 may further include a dustproof module 8. The dustproof module 8 may also be disposed opposite to or corresponding the opening hole 23 of the housing 2. The dustproof module 8 may be moved to cover the opening 8 and close the opening hole 23 or may be moved away from the opening hole 23 to open the opening hole 23. When the wireless charger 1 is not in use, the dustproof module 8 may block dust and the like from entering the housing 2 via the opening hole 23.

Figure 4:
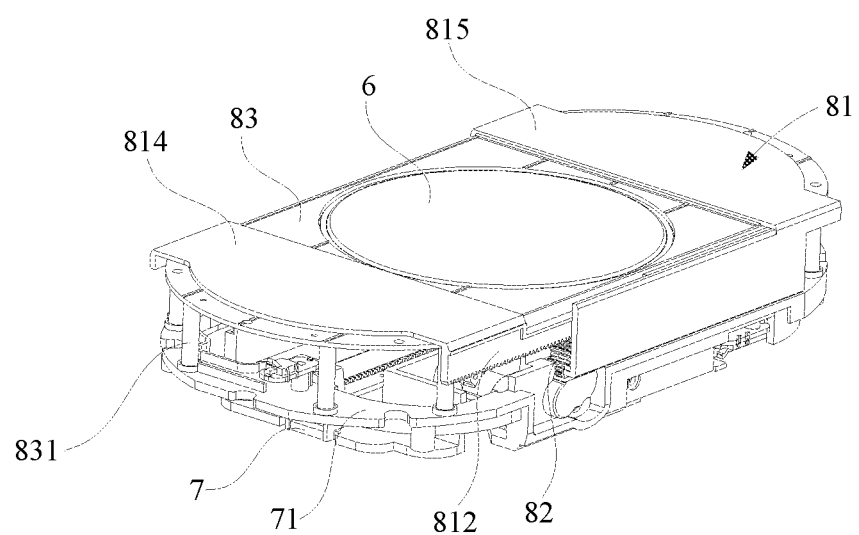
FIG. 4 is a partial structural view of the wireless charger shown in FIG. 1.

As shown in FIG. 2 and FIG. 4, the dustproof module 8 may include a dustproof door 81 and a driving assembly 82 for the dustproof door 81. The driving assembly 82 may be connected to the dustproof door 81, and the driving assembly 82 may drive the dustproof door 81 to move to open or close the opening hole 23.

The dustproof module 8 may further include a supporting plate 83. The supporting plate 83 may be received in the upper shell 21. A motion chamber 85 may be formed or defined between the supporting plate 83 and an inner sidewall of the upper shell 21. The dustproof door 81 may be movable within the motion chamber 85. The supporting plate 83 may be configured to support the dustproof door 81. The supporting plate 83 may support the dustproof door 81, to reduce the risk of the falling off of the dustproof door 81, which affects other components in the housing 2 and affects other functions of the wireless charger 1.

In addition, a supporting post 831 may be disposed on the supporting plate 83 at one side opposite to or facing away from the dustproof door 81. The supporting post 831 may abut on the protruding edge 71 to fix the supporting plate 83.

The dustproof door 81 may include a panel 811 and a connecting plate 812. The connecting plate 812 may be vertically disposed at one side of the panel 811 in a direction away from the upper shell 21. A rack may be arranged on the connecting plate 812. More specifically, the dustproof door 81 may include a pair of panels 811 disposed opposite to each other. Each of the pair of panels 811 may be movable such that the pair of panels 711 may move away from each other or move toward to each other to open or close the opening hole 23.

The driving assembly 82 may include a deceleration mechanism 821 for dustproof door. The deceleration mechanism 821 may be implemented as a deceleration mechanism. An output gear 8211 of the deceleration mechanism 821 may be meshed with or engaged with the rack on the connecting plate 812. The output gear 8211 may rotate to drive the rack on the connecting plate 812 to move, thereby driving the dustproof door 81 to move. As shown in FIG. 3, the deceleration mechanism 821 may be driven by a motor. The motor may drive the output gear 8211 of the deceleration mechanism 821 to rotate forwardly or reversely. In some embodiments, the output gear 8211 of the deceleration mechanism 821 may be implemented as an idler gear. The idler gear may be connected to the frame 7 through an idler shaft 8212.

As further shown in FIG. 1, more specifically, in some embodiments, the dustproof door 81 may include a first dustproof sub-door 814 and a second dustproof sub-door 815. A first rack 816 may be disposed on the connecting plate 812 of the first dustproof sub-door 814, and a second rack 817 may be disposed on the connecting plate 812 of the second dustproof sub-door 815. The second rack 817 may extend to be disposed opposite to the first rack 816, that is, the first rack 816 and the second rack 817 may be disposed at two opposite sides of the output gear 8211. The output gear 8211 of the deceleration mechanism 821 may be meshed or engaged between the first rack 816 and the second rack 817. The output gear 8211 of the deceleration mechanism 821 may rotate forwardly or reversely, such that the first rack 816 and the second rack 817 may be driven to move toward or away from each other, thereby closing or opening the opening hole 23. Herein, in some embodiments, the first rack 816 and the second rack 817 each may be moved by the rotation of the output gear 8211.

It may be understood that, the number of dustproof sub-doors may also be one, three, or four. When only one dustproof sub-door is provided, the driving assembly 82 may drive the dustproof sub-door to move from one side of the opening hole 23 to the other side of the opening hole 23, thereby opening or closing the opening hole 23. When three or more dustproof sub-doors are provided, the driving assembly 82 may drive three dustproof sub-doors to move towards or away from a center of the opening hole 23. Thus, it is also possible to close or open the opening hole 23.

The dustproof module 8 may also include a sensing switch 818. The sensing switch 818 may be configured to sense whether a device to be charged is placed on the housing 2. The sensing switch 818 may be electrically connected to the driving assembly 82. When the sensing switch 818 senses that the device to be charged is disposed on the housing 2, the sensing switch 818 may control to actuate the driving assembly 82 and the driving assembly 82 may further drive the dustproof door to move so as to open the opening hole 23. The sensing switch 818 may automatically control the driving assembly 82, such that the opening hole 23 may be opened or closed in time, and thus the user experience may be improved. It may be understood that, the sensing switch 818 may be implemented as an infrared sensor, an infrared pair tubes, or other distance sensors.

As shown in FIGS. 1 and 2, more specifically, in some embodiments, the wireless charger 1 may further include a main board 9. The main board 9 may be fixed in the housing 2. More specifically, the main board 9 may be fixedly disposed on the protruding edge 71. The main board 9 may be configured to control the lifting module 3, the translation module 4, the charging module 5, and the dustproof module 8. The lifting module 3, the translation module 4, the charging module 5, and the dustproof module 8 may be electrically connected to the main board 9, respectively. More specifically, the sensing switch 818 of the dustproof module 8 may be electrically connected to the main board 9. The main board 9 may receive a sensing signal and send a control signal to the driving assembly 82, thereby achieving the control of the driving assembly 82.

It may be understood that, the main board 9 may be omitted. The lifting module 3, the translation module 4, the charging module 5, and the dustproof module 8 of the wireless charger 1 may be provided with controllers respectively, and the controllers of all these components may be electrically connected to each other. In this way, the control function of the main board 9 may also be realized.

Figure 5:
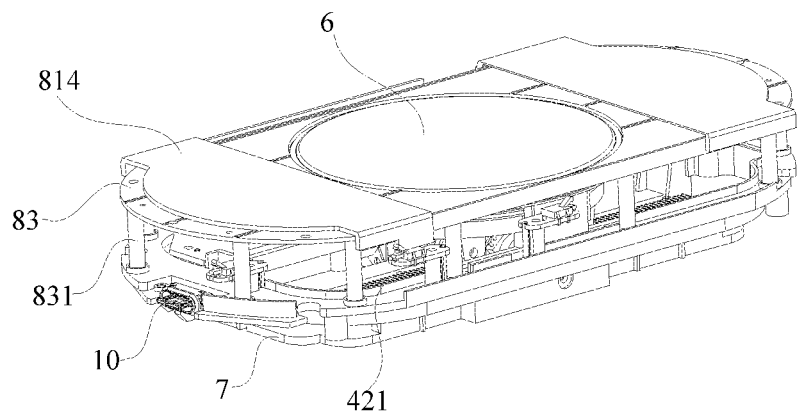
FIG. 5 is another perspective view of the wireless charger shown in FIG. 4 viewing from another aspect.

As shown in FIG. 5, the wireless charger 1 may also include a plug 10. The plug 10 may be configured for electrical connection with an external power supply. It may be understood that the plug 10 may be implemented as a USB (Universal Serial Bus) plug, or the like. The plug 10 may be electrically connected to the main board 9, and may be configured to supply power to the main board 9.

Figure 6:
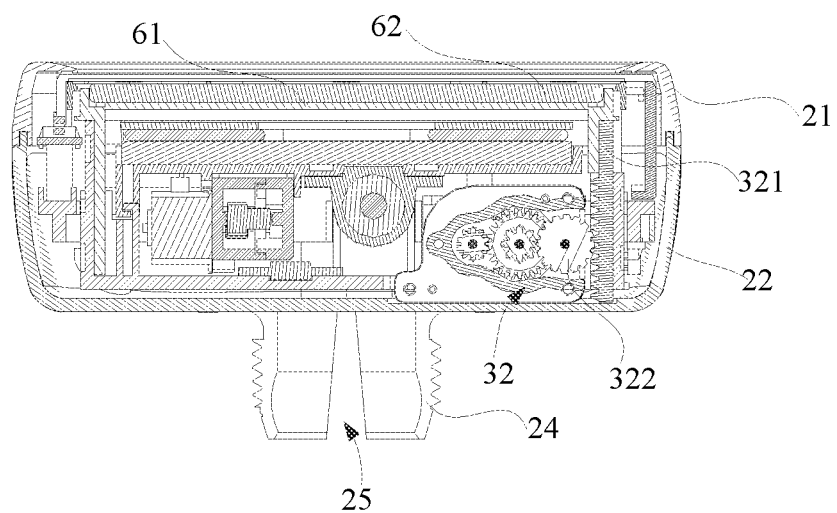
FIG. 6 is another cross-sectional view of the wireless charger shown in FIG. 1 viewing from a further aspect.
Figure 7:
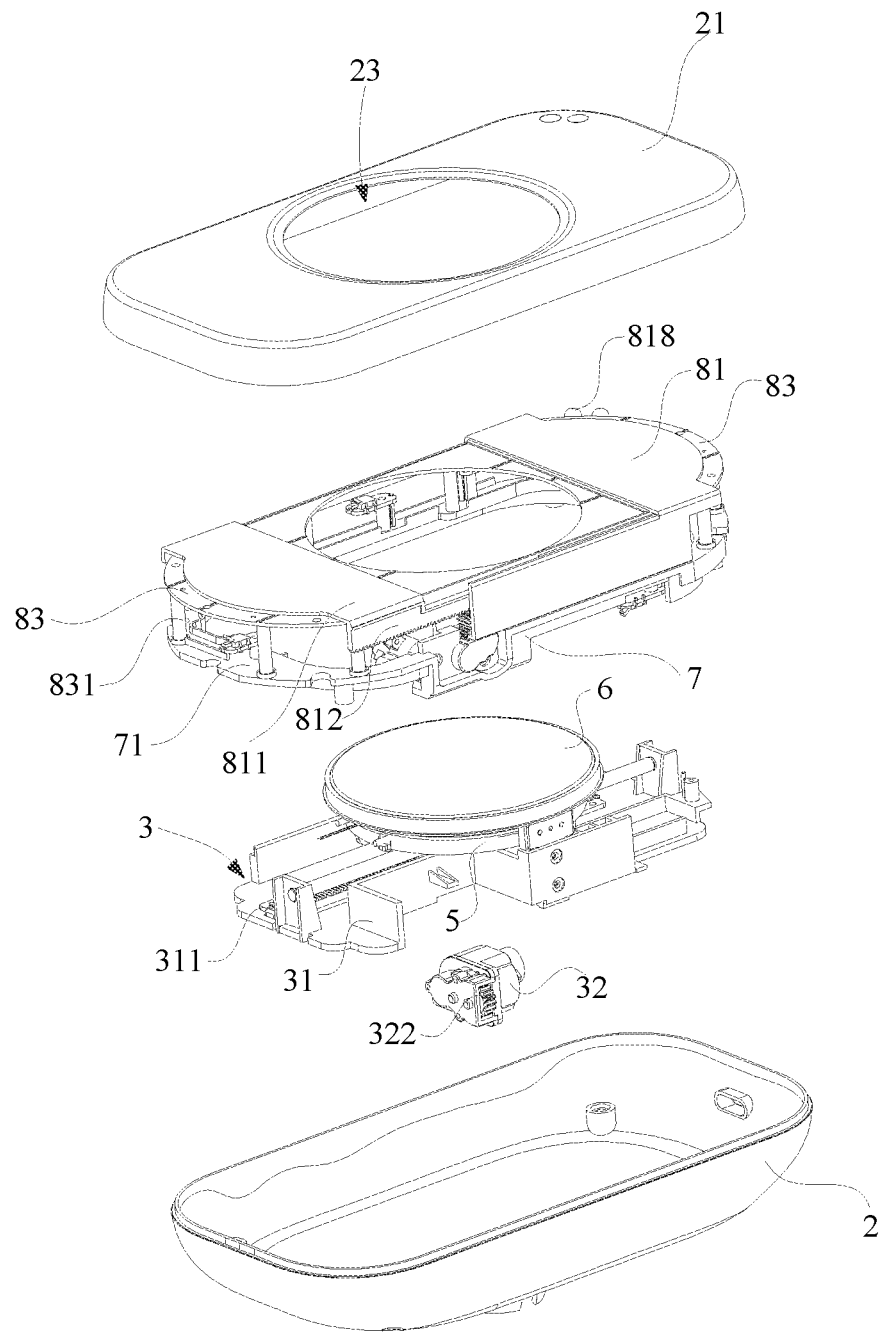
FIG. 7 is another exploded view of the wireless charger shown in FIG. 1 according to some embodiments of the present disclosure.

As shown in FIG. 6 and FIG. 7, the lifting module 3 may include a lifting bracket 31 and a driving mechanism 32 for lifting. The lifting bracket 31 may be configured to carry or bear the charging module 5, the connecting module 6, and the translation module 4. The driving assembly 32 may be disposed on an outer peripheral side of the lifting bracket 31; that is, the driving assembly 32 may be disposed on an outer periphery of the lifting bracket 31. The driving assembly 32 may be connected to the lifting bracket 31, and the driving assembly 32 may be configured to drive the lifting bracket 31 to lift or move up and down. The lifting bracket 31 may be received in the bottom of the frame 7. The lifting bracket 31 may be movably connected to the annular inner sidewall of the frame 7. The lifting bracket 31 may be movable up and down with respect to the annular sidewall of the frame 7. It may be understood that, the lifting bracket 31 may be slidably connected to the frame 7 via a cooperation of a protrusion and a sliding groove.

More specifically, in some embodiments, the driving assembly 32 may include a lifting rack 321 and a deceleration mechanism 322 for lifting. The lifting rack 321 may be fixed on the lifting bracket 31. The deceleration mechanism 322 for lifting may be fixed on the frame 7. An output gear of the deceleration mechanism 322 may move up and down along the lifting rack 321 and further drive the lifting bracket 31 to move up and down. The deceleration mechanism 322 may be driven by a motor. The motor may drive the output gear of the deceleration mechanism 322 to rotate forwardly or reversely. In this way, the lifting bracket 31 may be lifted up or lowered down.

Figure 8:
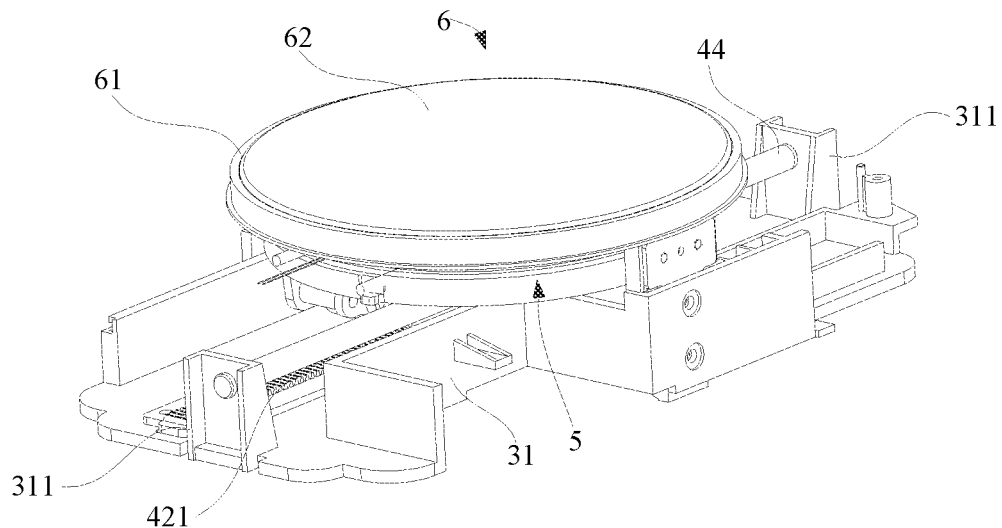
FIG. 8 is a partial structural view of the wireless charger shown in FIG. 7.

As shown in FIGS. 2 and 8, the lifting bracket 31 may further include a guiding element 311. The guiding element 311 may be disposed on the outer periphery of the lifting bracket 31, and spaced apart from the driving assembly 32. In some embodiments, as shown in FIG. 2, the lifting bracket 31 may have a lengthwise direction and a width direction. The driving assembly 32 may be disposed on an edge of the lifting bracket 3 1extending along the lengthwise direction, while the guiding element 311 may be disposed on another edge of the lifting bracket 31 along the width direction. A guiding rail 72 may be disposed on the inner sidewall of the frame 7. The guiding rail 72 may cooperate with the guiding element 311, and the guiding element 311 may be movable along the guiding rail 72. More specifically, in some embodiments, the guiding element 311 may be implemented as a convex rib, and the guiding rail 72 may be implemented as a sliding groove. The sliding groove cooperating with the convex rib may be defined on the inner sidewall of the frame 7. The convex rib may be slidable along the sliding groove.

The connecting module 6 may be disposed on the lifting module 3 and may be disposed opposite to or corresponding to the opening hole 23. The connecting module 6 may be configured to carry the device to be charged and be further fixedly connected the device. The connecting module 6 may move up and down along with the lifting module 3, and further pass through the opening hole 23. When the lifting module 3 drives the connecting module 6 to extend out from the opening hole 23, a portion of the connecting module 6 that extends out of the opening hole 23 should be disposed at a level higher than an outer surface 211 of the upper shell 21, or substantially at the same level or flush with the outer surface 211 of the upper shell 21. The connecting module 6 may be exposed out of the outer side of the housing 2 for the convenience of the connection to the device to be charged.

Figure 9:
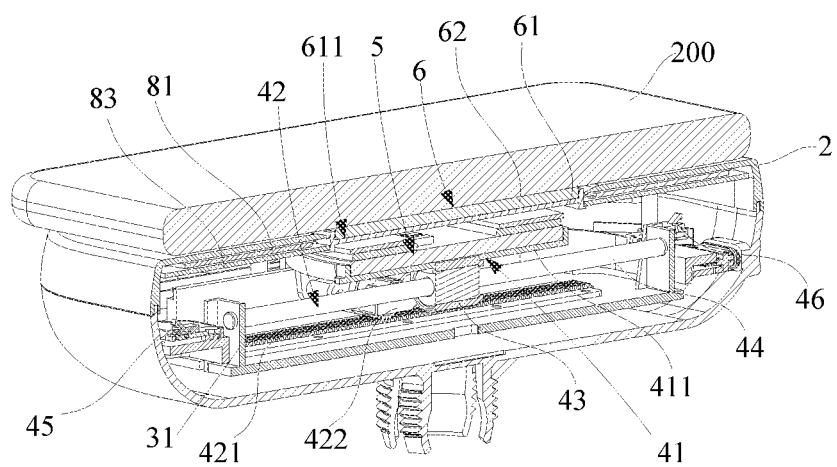
FIG. 9 is another cross-sectional view of the wireless charger shown in FIG. 1 viewing from a further aspect.

As shown in FIG. 9, in some embodiments, the connecting module 6 may include a bearing bracket 61 and an adhesive layer 62. The bearing bracket 61 may have a disc structure. The lifting rack 321 may be fixed at one side of the bearing bracket 61. The bearing bracket 61 may be fixedly connected to and disposed on the lifting rack 321 of the lifting module 3. When the lifting rack 321 moves up and down, the bearing bracket 61 may move up and down along with the lifting rack 321.

A bearing platform may be disposed at a top of the bearing bracket 61. The adhesive layer 62 may be disposed on the bearing platform. The adhesive layer 62 may be configured to bond and fix the device 200 to be charged. The wireless charger 1 may be used in a vehicle, and the adhesive layer 62 may ensure that the device 200 may be stably placed on the wireless charger. It may be understood that, the adhesive layer 62 may be a hook-and-loop adhesive layer, a soft adhesive layer, or the like. Since dust and other debris may be easily adhered to the adhesive layer 62, the adhesive layer 62 may be easily polluted. More specifically, in some embodiments, the wireless charger 1 may be disposed in the housing 2 via the connecting module 6. The dustproof module 8 may be configured to shield and protect the adhesive layer 62, in order to reduce the possibility that the adhesive layer 62 is polluted and adhered with dust.

As shown in FIG. 2, more specifically, a recess 611 may be defined at the top of the bearing bracket 61. The adhesive layer 62 may be received in the recess 611. The adhesive layer 62 may enter the opening hole 23 along with the lifting movement of the bearing bracket 61 and the lifting rack 321. The adhesive layer 62 may be configured for adhesively connecting to the device to be charged 200, such that the device to be charged may be stably disposed on the wireless charger 1.

As shown in FIG. 2, the lifting module 3 may further include a raising switch 33. When the lifting module 3 raises to a preset position, the lifting module 3 may trigger the raising switch 33. Herein, the preset position may be the position in which the connecting module 6 protrudes out of the housing 2. When the connecting module 6 protrudes out of the housing 2 to a certain distance, the device to be charged may be successfully and fixedly connected to the connecting module 6. In addition, the distance that the connecting module 6 protrudes out of the housing 2 may not be too large. It is necessary to ensure that the distance between the device to be charged and the charging module 5 meets the maximum distance at which the charging coil 51 may be coupled to the charging coil of the device to be charged. Moreover, the charging module 5 needs to be disposed in the housing 2 to implement the translation of the charging module 5. It should reduce the possibility that the connecting module 6 protrudes out of the housing 2 to a too large distance, in which case the device to be charged may be far away from the charging module 5, which makes the charging coil of the device to be charged cannot be coupled to the charging coil 51 of the charging module 5 and which affects the normal charging of the wireless charger 1.

Furthermore, the raising switch 33 may control the lifting module 3 to stop lifting. The raising switch 33 may be electrically connected to the main board 9. The main board 9 may control a working state of the deceleration mechanism 322 for lifting according to the control signal of the raising switch 33. It may be understood that the raising switch 33 may be a mileage switch, an infrared switch, a photoelectric switch, or the like.

As shown in FIG. 9, the translation module 4 may include a translation bracket 41 and a driving assembly 42 for translation. The translation bracket 41 may be configured to support the charging module 5 and drive the charging module 5 to translate. The driving assembly 42 may be connected to the translation bracket 41, and configured to drive the translation bracket 41 to translate.

More specifically, in some embodiments, the translation bracket 41 may include a supporting plate 411 for translation. The supporting plate 411 may be configured to carry or bear the charging module 5.

The driving assembly 42 may also include a linear bearing 43 and a shaft 44. The linear bearing 43 may be slidably sleeved on the shaft 44. Herein, the shaft 44 may be a linear shaft. In some embodiments, the shaft 44 may be a shaft without a stepped portion.

Both ends of the shaft 44 may be fixed to the lifting bracket 31. An axial direction of the shaft 44 may be the same as an axial direction of the translation rack 421. The linear bearing 43 may be fixed on a side face of the supporting plate 411 facing away from the charging module 5.

The driving assembly 42 may include a translation rack 421 and a deceleration mechanism 422 for translation. In some embodiments, the deceleration mechanism 422 may be implemented as a deceleration mechanism. An output gear of the deceleration mechanism 422 may be meshed with or engaged with the translation rack 421.

The translation rack 421 may extend along the longitudinal direction of the housing 2. The translation module 4 may drive the charging module 5 to move along the longitudinal direction of the housing 2. Therefore, if the charging module 5 moves in the direction of the translation rack 421, the charging module 5 may move correspondingly to a position of the charging coil on the device to be charged 200. When the device to be charged 200 is a mobile phone, the width direction of the housing 2 may be similar to or substantially the same as the width direction of the mobile phone. Therefore, when the mobile phone is placed on the connecting module 6, the mobile phone may be fixed in the width direction of the housing 2 without moving.

It may be understood that, it is possible to provide a plurality of translation racks 421. The plurality of translation racks 421 may be arranged at an angle from each other, such that the charging module 5 may perform a two-dimensional movement in the entire plane, and the position of the charging module 5 may be better adjusted. In this way, the charging module 5 may be aligned with the charging coil of the mobile phone.

Moreover, in other embodiments, the translation rack 421 may also extend along the width direction of the housing 2. The translation module 4 may drive the charging module 5 to move along the width direction of the housing 2. However, the extension direction of the translation rack 421 may be not limited here, and may be designed accordingly according to the position of the charging coil of the device to be charged.

Figure 10:
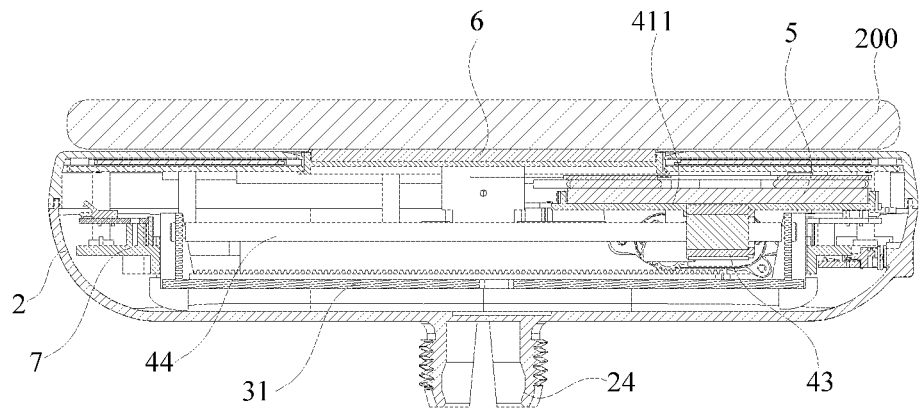
FIG. 10 is another cross-sectional view of the wireless charger shown in FIG. 1 viewing from a further aspect.
Figure 11:
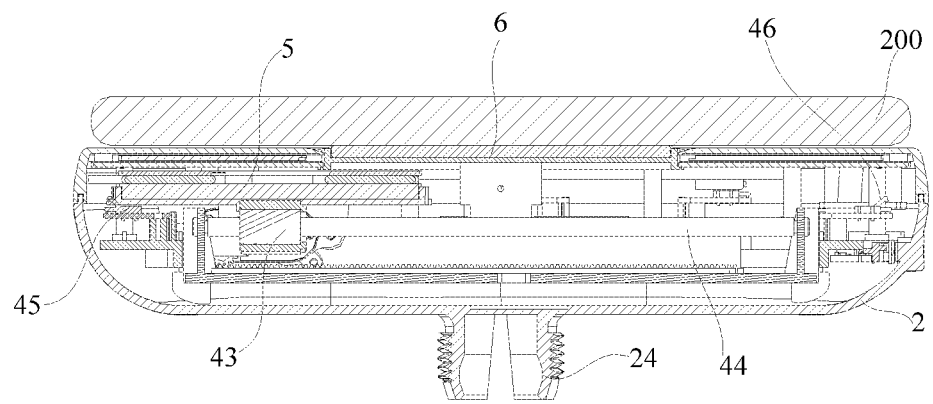
FIG. 11 is another cross-sectional view of the wireless charger shown in FIG. 1 viewing from a further aspect.

The deceleration mechanism 422 for translation may be fixedly connected to the translation bracket 41. More specifically, the deceleration mechanism 422 may be fixedly disposed on a side face of the supporting plate 411 facing away from the charging module 5. An output gear of the deceleration mechanism 422 may move or translate or displace along the translation rack 421. The deceleration mechanism 422 may be driven by a motor, and the motor may drive the output gear of the deceleration mechanism 422 to rotate forwardly or reversely, thereby driving the deceleration mechanism 422 to translate leftward and rightward along the translation rack 421. As shown in FIG. 10 and FIG. 11, FIG. 10 is a schematic view in which the charging module 5 moves to the far right, and FIG. 11 is a schematic view in which the charging module 5 moves to the far left.

When the deceleration mechanism for translation 422 moves along the translation rack 421, the deceleration mechanism 422 may drive the supporting plate 411 to move, and the supporting plate 411 may further drive the charging module 5 to move. At the same time, the supporting plate 411 may move to drive the linear bearing 43 to translate or displace along the shaft 44. The linear bearing 43 may be translated along the shaft 44, which may assist the supporting plate 411 to move. In this way, it is possible to ensure that the supporting plate 411 may move stably.

Figure 12:
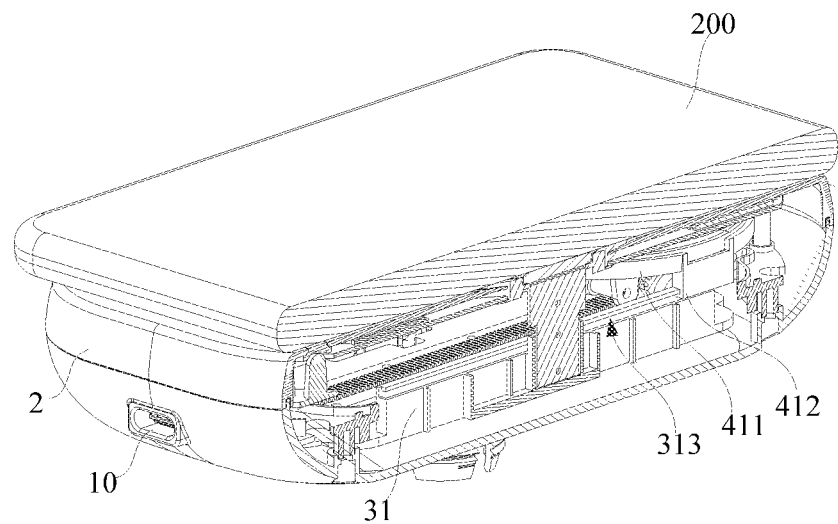
FIG. 12 is another cross-sectional view of the wireless charger shown in FIG. 1 viewing from a further aspect.

As shown in FIG. 12, a protruding slider 412 may be further disposed on the supporting plate 411. The protruding slider 412 may be cooperatively connected to the lifting bracket 31 of the lifting module 3 to support the supporting plate 411. When the output gear of the deceleration mechanism 422 moves along the translation rack 421, the output gear of the deceleration mechanism 422 may apply a downward pressure on the translation rack 421. The cooperation of the protruding slider 412 and the lifting bracket 31 may counteract this pressure. In this way, it is possible to reduce the possibility of the over-pressure deformation of the translation rack 421, which affects the translation movement of the supporting plate 411.

More specifically, in some embodiments, a guiding groove 313 may be defined in the lifting bracket 31 in a position corresponding to the protruding slider 412. The guiding groove 313 may extend along the extending direction of the translation rack 421. The protruding slider 412 may be cooperatively connected to the guiding groove 313. More specifically, the protruding slider 412 may be slidable along the guiding groove 313. In this way, the supporting plate 411 may be also connected to the lifting bracket 31 via the protruding slider 412, such that the supporting plate 411 may stably move along the translation rack 421.

As shown in FIG. 11, the driving assembly 42 may further include a first translation switch 45 and a second translation switch 46. The first translation switch 45 and the second translation switch 46 may be respectively located at two opposite ends of a translation path of the translation bracket 41. That is to say, the first translation switch 45 may be disposed at one end of the translation path of the translation bracket 41, while the second translation switch 46 may be disposed at the opposite end of the translation path of the translation bracket 41 and opposite to the first translation switch 45. When the translation bracket 41 moves to one of two opposite ends of the translation path, the first translation switch 45 or the second translation switch 46 may control the driving assembly 42 to stop driving the translation bracket 41 to move.

Both the first translation switch 45 and the second translation switch 46 may be electrically connected to the main board 9. The main board 9 may control the operation of the translation motor according to the signals of the first translation switch 45 and the second translation switch 46.

It may be understood that the first translation switch 45 and the second translation switch 46 may be a mileage switch, an infrared switch, an image acquisition switch, and the like.

As shown in FIG. 2, the charging module 5 may include a charging coil 51 and a charging circuit or charging wire 52. The charging coil 51 may be electrically connected to the charging circuit 52. More specifically, in some embodiments, the charging coil 51 may be a transmitting coil. The transmitting coil may be configured to transmit electromagnetic energy. The device to be charged may have a receiving coil, and the charging coil 51 may be configured to charge the device to be charged. The charging circuit 52 may be electrically connected to the main board 9, and the main board 9 may be configured to supply power to the charging circuit 52.

More specifically, in some embodiments, the deceleration mechanism for lifting 322, the deceleration mechanism for translation 422, and the deceleration mechanism for dustproof door 821 may be implemented as a type of reduction gearbox. This type of reduction gearbox may be used in different locations to achieve different functions. For example, the deceleration mechanism for dustproof door 821 may be the reduction gearbox of the dustproof module 8 for translating the dustproof door. The deceleration mechanism for lifting 322 may be the reduction gearbox of the lifting module 3 for lifting, and the deceleration mechanism for translation 422 may be the reduction gearbox of the translation module 4 for translating the charging module 5.

Figure 13:
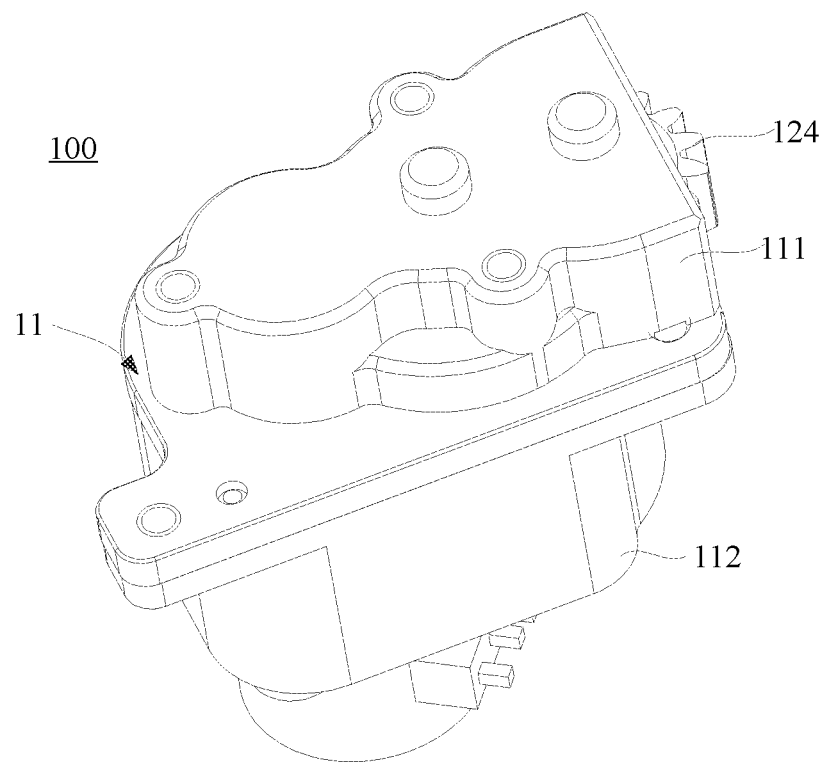
FIG. 13 is a perspective view of a deceleration mechanism of the wireless charger shown in FIG. 2.
Figure 14:
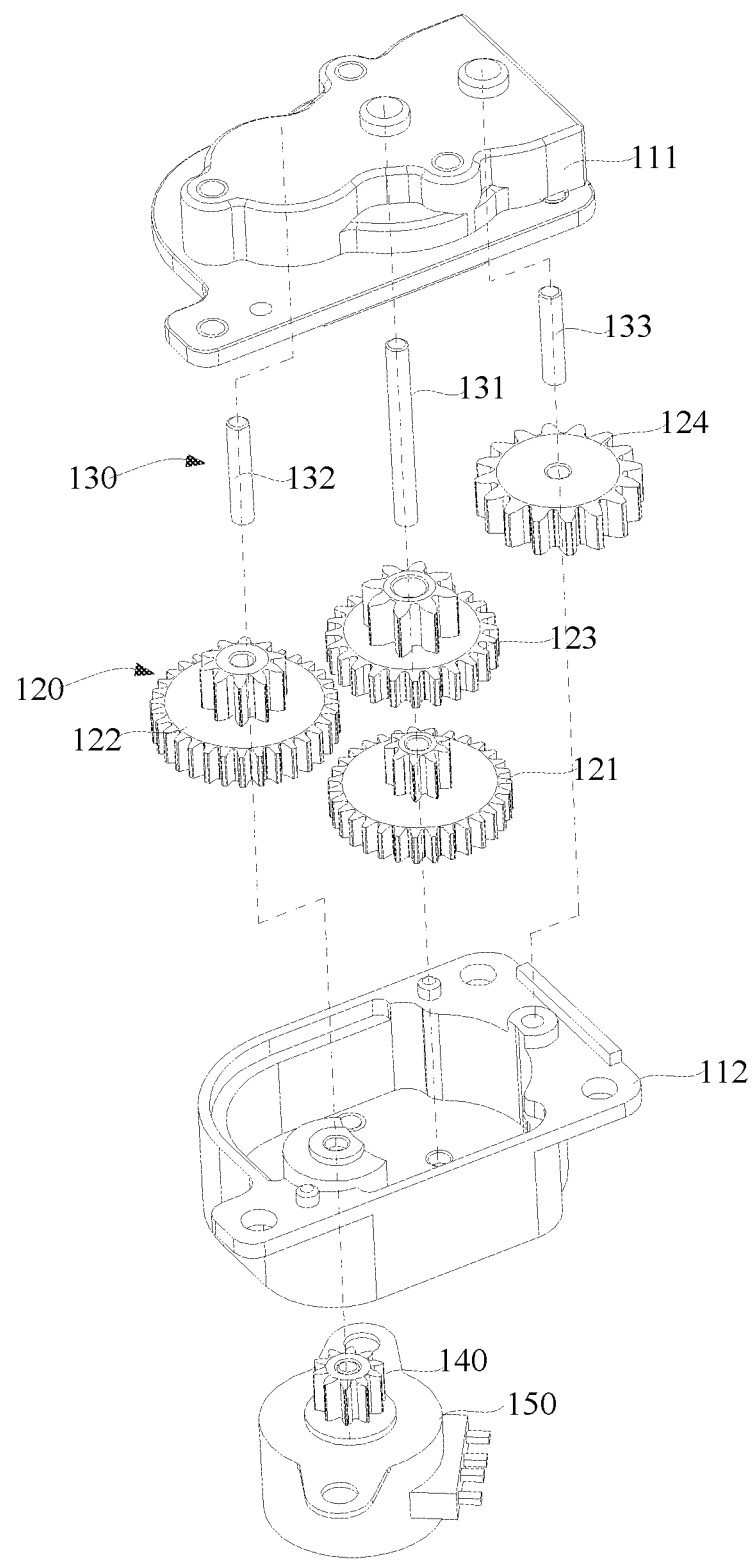
FIG. 14 is an exploded view of the deceleration mechanism shown in FIG. 13.
Figure 15:
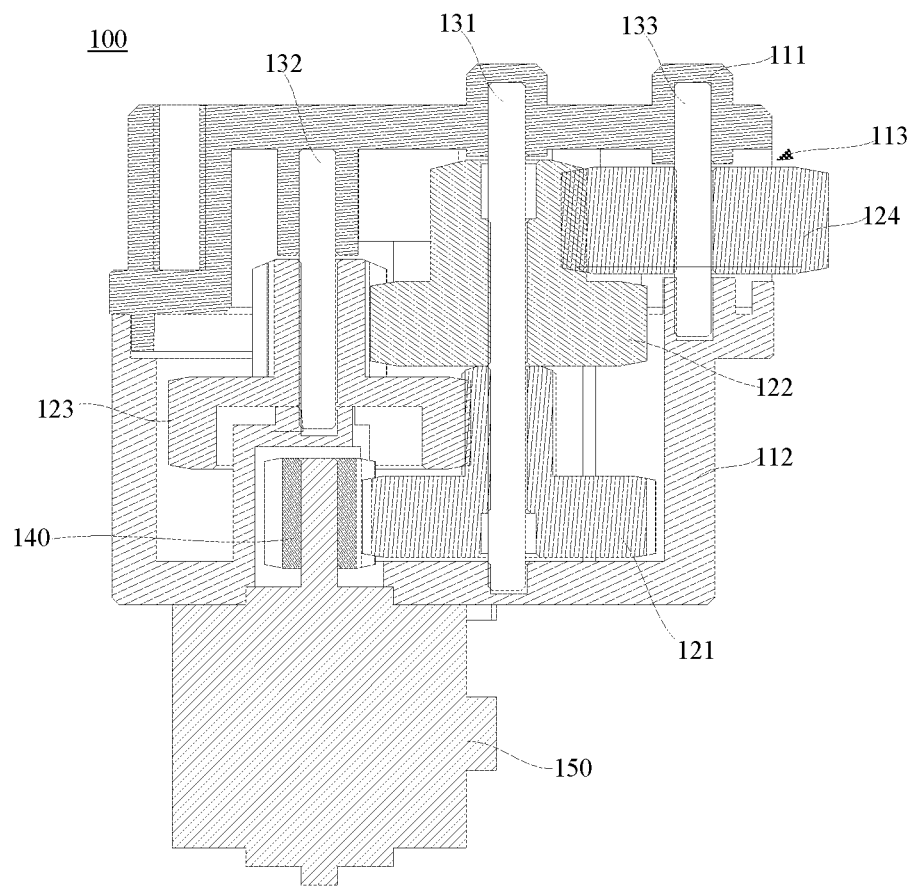
FIG. 15 is cross-sectional view of the deceleration mechanism shown in FIG. 13.

More specifically, the deceleration mechanism for lifting 322 of the lifting module 3 may need a larger torque, and thus the torque of the deceleration mechanism for lifting 322 may be greater than the torque of the deceleration mechanism for translation 422 and the deceleration mechanism for dustproof door 821. FIGS. 13-15 show the configuration of at least one reduction gearbox 100 which can be used as the deceleration mechanism for lifting 322, the deceleration mechanism for translation 422, and the deceleration mechanism for dustproof door 821. As shown in FIG. 13, FIG. 14 and FIG. 15, at least one reduction gearbox 100 may include a box body 110, a plurality of gears 120, and a plurality of gear shafts 130. The box body 110 may be divided into an upper box body 111 and a lower box body 112. The upper box body 111 and the lower box body 112 cooperatively define a receiving space for receiving the plurality of gears 120 and the plurality of rotating shafts. The upper box body 111 of the reduction gearbox 100 may be screwed to the lower box body 112 of the reduction gearbox via a screw.

The plurality of gears 120 and the plurality of gear shafts 130 may be disposed in the box body 110. The plurality of gears 120 may include a plurality of driven gears. The gear 120 may include a first-stage gear 121, a second-stage gear 122, a third-stage gear 123, and an output gear 124. The first-stage gear 121 may be an input gear, and the input gear may be configured for connection with a motor gear 140 on a rotating shaft of a motor 150. The plurality of gear shafts 130 may include a first-stage shaft 131, a second-stage shaft 132, and an output shaft 133.

The main board 9 may drive the motor 150 to rotate, and the motor gear 140 may be tightly fitted on the rotating shaft of the motor 150. The motor gear 140 may drive the first-stage gear 121 to rotate, the first-stage gear 121 may in turn drive the second-stage gear 122 to rotate, the second-stage gear 122 may further drive the third-stage gear 123 rotates, and the three-stage gear 123 may further drive the output gear 124 to rotate. In this way, the torque and speed of the motor 150 may be transmitted to other gears, racks or mechanisms.

More specifically, in some embodiments, at least two of the plurality of gears 120 may be located on the same gear shaft 130. The motor 150 may be fixed on the lower box body 112 of the reduction gearbox, and the motor gear 140 may be tightly fitted on the gear shaft 130. The first-stage gear 121 and the third-stage gear 123 may be mounted on the first-stage shaft 131 and have the same rotating direction. The second-stage gear 122 may be mounted on the second-stage shaft 132 and may be concentric with the first-stage gear 121. The output gear 124 may be mounted on the output shaft 133. The first-stage shaft 131, the second-stage shaft 132, and the output shaft 133 may be assembled to the upper box body 111 of the reduction gearbox.

It may be understood that, in other embodiments, for the reduction gearbox 100, it is also possible that three gears 120 are disposed or arranged on the same gear shaft 130 to meet the design space requirements of the reduction gearbox.

Therefore, in the above reduction gearbox, the first-stage gear 121 and the third-stage gear 123 may be both arranged on the first-stage shaft 131, and the plurality of gears 120 share one gear shaft 130. In this way, it is possible to save the volume and space of the reduction gearbox 100.

More specifically, in some embodiments, an opening 113 may be defined at one side of the upper box body 111 of the reduction gearbox. The opening 113 may be configured to expose a part of the teeth of the output gear 124 out of the upper box body 111. The output gear 124 may be drivingly connected to the motor gear 140 through the plurality of gears 120, and the output gear 124 may provide a driving function.

More specifically, in some embodiments, a part of the teeth of the output gear 124 may be exposed outside, and may be meshed or engaged with other gears, the lifting rack 321, the translation rack 421, or the like, or may serve as a component and be assembled to other machines to transfer torque and speed to other machines. In this way, it is possible to facilitate the use of the reduction gearbox, increase the usage functions of reduction gearbox.

Figure 16:
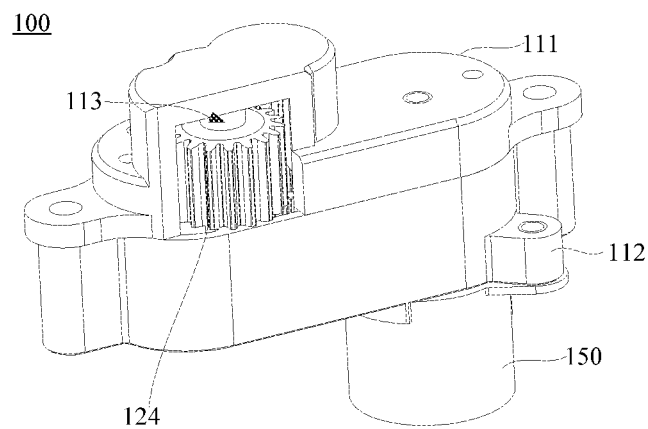
FIG. 16 is a deceleration mechanism of the wireless charger shown in FIG. 13 according to some embodiments of the present disclosure.
Figure 17:
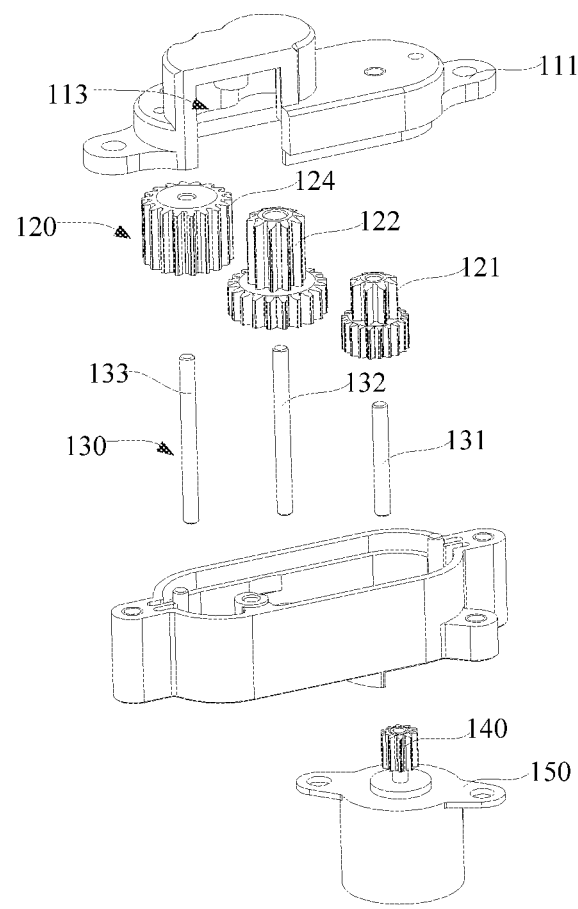
FIG. 17 is an exploded view of the deceleration mechanism shown in FIG. 16.
Figure 18:
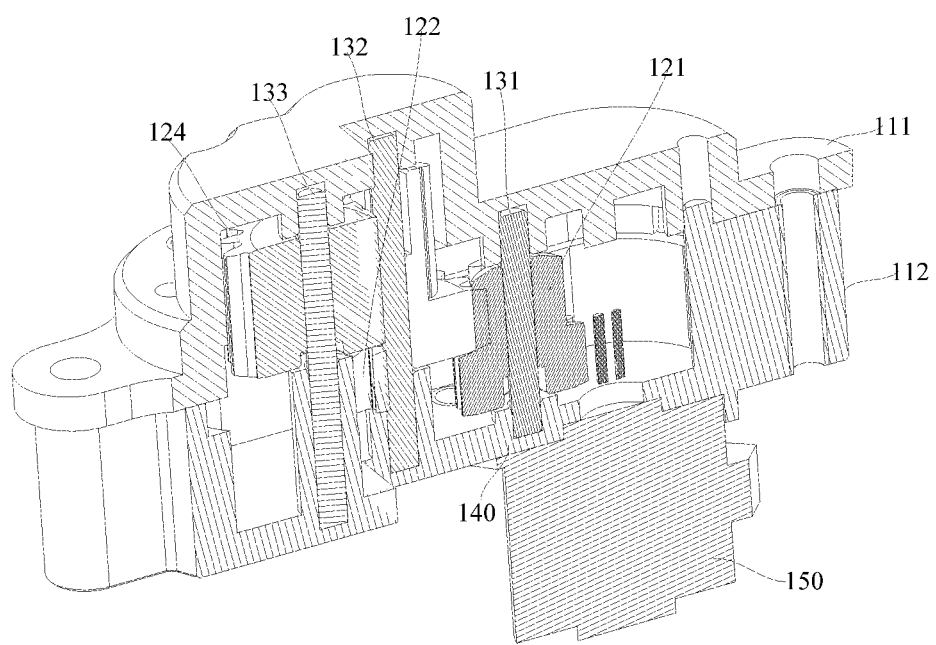
FIG. 18 is cross-sectional view of the deceleration mechanism shown in FIG. 16.

As shown in FIG. 16, FIG. 17 and FIG. 18, in some embodiments, in the reduction gearbox 100, the motor gear 140 may be tightly fitted on the driving shaft. When the driving shaft of the motor 150 rotates, the motor gear 140 may drive the first-stage gear 121 to rotate. The first-stage gear 121 may in turn drive the second-stage gear 122 to rotate, and the second-stage gear 122 may further drive the output gear 124 to rotate. In this way, the torque and speed of the motor 150 may be transmitted to other racks or mechanisms.

The motor 150 may be fixed on the lower box body 112 of the reduction gearbox, and the motor gear 140 may be tightly fitted on the driving shaft of the motor 150. The first-stage gear 121 may be assembled on the first-stage shaft 131, the second-stage gear 122 may be assembled on the second-stage shaft 132, and the output gear 124 may be assembled on the output shaft 133. The first-stage shaft 131, the second-stage shaft 132, and the third-stage shaft 133 may be tightly fitted on the lower box body 112 of the reduction gearbox, and the upper box body of the reduction gearbox may be locked with the lower box body 112 of the reduction gearbox by a screw.

An opening 113 may be defined at one side of the upper box body 111 of the reduction gearbox. The opening 113 may be configured to expose a part of the teeth of the output gear 124 out of the upper box body 111. The output gear 124 may be drivingly connected to the motor gear 140 through the plurality of gears 120, and the output gear 124 may provide a driving function.

In other embodiments, the driving assembly 32, the driving module for translation and the driving module for dustproof door may also be a driving assembly such as a telescopic cylinder, a telescopic motor, a conveyor belt, or the like, which also achieves the purpose of driving movement.

In other embodiments, it is also possible to provide only the translation module 4, and the lifting module 3 may be omitted. At this time, the connecting module 6 may be exposed out of the housing 2 via the opening 23, and will not be retracted back into the housing 2.

Although the present disclosure has been described with reference to several example embodiments, it should be understood that the terms used herein may be illustrative and examples, rather than limiting. Since the present disclosure may be embodied in various forms without departing from the spirit or essence of the present disclosure, it should be understood that the above embodiments may be not limited to any of the foregoing details, but should be widely interpreted within the spirit and scope defined by the appended claims. Therefore, all changes and modifications falling within the scope of the claims or their equivalents should be covered by the appended claims.

What is claimed is:

1. A wireless charger, comprising:
   a housing, defining an opening hole;
   a lifting module, received in the housing and movable up and down in the housing;
   a translation module, disposed on the lifting module and capable of translating in the housing and movable up and down along with the lifting module;
   a charging module, arranged on the translation module, configured to charge a device to be charged, and capable of translating in the housing along with the translation of the charging module; and
   a connecting module, disposed on the lifting module and located at a side of the charging module away from the translation module, arranged correspondingly to the opening hole, and configured to be connected to the device to be charged, wherein the lifting module is capable of driving the connecting module to move up and down and be further exposed out of the housing from the opening hole,
   wherein when the wireless charger is configured to charge a device, the connecting module is exposed out of the housing, the connecting module has an exposed surface, and the exposed surface is flush with an outer surface of the housing, and the charging module is received inside of the housing and is translated to align with a charging coil of the device.

2. The wireless charger as claimed in claim 1, wherein the lifting module comprises:
   a lifting bracket, configured to carry the charging module and the connecting module; and
   a first driving assembly, disposed on an outer periphery of the lifting bracket, connected to the lifting bracket, and configured to drive the lifting bracket to move up and down.

3. The wireless charger as claimed in claim 2, wherein the first driving assembly comprises:
   a lifting rack, connected to the lifting bracket; and
   a first deceleration mechanism for lifting, having an output gear movable up and down along the lifting rack and configured to drive the lifting bracket to move up and down.

4. The wireless charger as claimed in claim 2, wherein the lifting bracket further comprises a guiding element, and the guiding element is disposed on the outer periphery of the lifting bracket and spaced apart from the first driving assembly; and
   the wireless charger further comprises a frame, the frame has an inner sidewall, a guiding rail is disposed on the inner sidewall of the frame, and the guiding element is cooperatively connected to the guiding element and movable along the guiding rail.

5. The wireless charger as claimed in claim 2, wherein the lifting module comprises a raising switch; and
   when the lifting module raises to a preset position, the raising switch is triggered to control the lifting module to stop raising up.

6. The wireless charger as claimed in claim 2, wherein the connecting module comprises:
   a bearing bracket, having a bottom and a top opposite to the bottom; wherein the bottom of the bearing bracket is disposed on the lifting module; and
   an adhesive layer, disposed on the top and configured to fix the device to be charged.

7. The wireless charger as claimed in claim 2, wherein the translation module comprises:
   a translation bracket, configured to support the charging module; and
   a second driving assembly, connected to the translation bracket and configured to drive the translation bracket to translate.

8. The wireless charger as claimed in claim 7, wherein the second driving assembly comprises:
   a translation rack; and
   a second deceleration mechanism for translation, connected to the translation bracket, having an output gear movable along the translation rack, and configured to drive the translation bracket to translate.

9. The wireless charger as claimed in claim 8, wherein the second driving assembly further comprises:
   a linear bearing, wherein the translation bracket is fixedly arranged on the linear bearing; and
   a shaft, wherein the linear bearing is slidably sleeved on the shaft, the shaft has an axial direction the same as an axial direction of the translation rack, and both ends of the shaft are fixed to the lifting bracket.

10. The wireless charger as claimed in claim 9, wherein the translation bracket comprises a first supporting plate for translation, wherein the first supporting plate for translation is configured to carry the charging module, and the linear bearing and the second deceleration mechanism for translation is fixedly disposed on a side face of the first supporting plate for translation opposite to the charging module;
   wherein a protruding slider is disposed on the first supporting plate for translation, and the protruding slider is slidably connected to the lifting module to support the first supporting plate for translation.

11. The wireless charger as claimed in claim 7, wherein the second driving assembly for translation further comprises a first translation switch and a second translation switch, the first translation switch and the second translation switch are located at two opposite ends of a translation path of the translation bracket, respectively;

wherein when the translation bracket moves to one of two opposite ends of the translation path, the first translation switch or the second translation switch is configured to control the second driving assembly for translation to stop driving the translation bracket to move.

12. The wireless charger as claimed in claim 1, further comprising a dustproof module, wherein the dustproof module is disposed correspondingly to the opening hole of the housing;

wherein the dustproof module comprises a dustproof door and a third driving assembly for the dustproof door, the third driving assembly for the dustproof door is connected to the dustproof door and configured to drive the dustproof door to move so as to open or close the opening hole.

13. The wireless charger as claimed in claim 12, wherein the dustproof door comprises a pair of panels disposed opposite to each other, and the pair of panels are movable away from each other or towards each other to open or close the opening hole.

14. The wireless charger as claimed in claim 12, wherein the dustproof module comprises a second supporting plate, the second supporting plate is received in the housing, the second supporting plate and an inner sidewall of the housing cooperatively define a motion chamber, the dustproof door is movable within the motion chamber, and the supporting plate is configured to support the dustproof door.

15. The wireless charger as claimed in claim 12, wherein the third driving assembly for the dustproof door comprises a third deceleration mechanism for the dustproof door, and the dustproof door comprises a panel and a connecting plate vertically disposed at one side of the panel; and the third deceleration mechanism for the dustproof door is connected to the connecting plate and configured to drive the panel to move so as to open or close the opening hole.

16. The wireless charger as claimed in claim 15, wherein the number of the dustproof doors is two, and the two dustproof doors comprise a first dustproof sub-door and a second dustproof sub-door, and each of the first dustproof sub-door and the second dustproof sub-door comprises a panel and a connecting plate; the panel is movable to open or close the opening hole, and the connecting plate is vertically disposed at one side of the panel; and a first rack is disposed on the connecting plate of the first dustproof sub-door, a second rack is disposed on the connecting plate of the second dustproof sub-door, the second rack extends to be disposed opposite to the first rack, and an output gear of the third deceleration mechanism for the dustproof door is engaged with both the first rack and the second rack;

wherein the output gear of the third deceleration mechanism is rotatable to drive the first rack and the second rack to move towards or away from each other.

17. The wireless charger as claimed in claim 12, wherein the dustproof module further comprises a sensing switch configured to sense whether the device to be charged is placed on the housing, and the sensing switch is electrically connected to the third driving assembly for the dustproof door;

wherein when the sensing switch senses the device to be charged, the sensing switch is capable of actuating the third driving assembly for the dustproof door to drive the dustproof door to open the opening hole.

18. The wireless charger as claimed in claim 1, wherein the lifting module comprises a first reduction gearbox for lifting, and the translation module comprises a second reduction gearbox for translation;

each of the first reduction gearbox for lifting and the second reduction gearbox for translation comprises a box body, a plurality of gears, and a plurality of gear shafts; and the plurality of gears and the plurality of gear shafts are disposed in the box body, and at least two of the plurality of gears are located on the same gear shaft.

19. A wireless charger, comprising:

a housing, defining an opening hole;

a lifting module, received in the housing and movable up and down in the housing;

a translation module, disposed on the lifting module and capable of translating in the housing and movable up and down along with the lifting module;

a charging module, fixedly arranged on the translation module, configured to charge a device to be charged, and capable of translating in the housing along with the translation of the charging module; and a connecting module, disposed on the lifting module, located at one side of the charging module facing away from the translation module, arranged correspondingly to the opening hole, and configured to be connected to the device to be charged, wherein the lifting module is capable of driving the connecting module to move up and down and be further exposed out of the housing from the opening hole, wherein when the wireless charger is configured to charge a device, the connecting module is exposed out of the housing, the connecting module has an exposed surface, and the exposed surface is flush with an outer surface of the housing, and the charging module is received inside of the housing and is translated to align with a charging coil of the device.

20. A wireless charger for charging a device to be charged, comprising:

a housing, defining an opening hole;

a lifting module, received in the housing and movable up and down in the housing;

a connecting module, disposed on the lifting module, arranged correspondingly to the opening hole, and configured to be connected to the device to be charged, wherein the connecting module is movable between a first position in which the connecting module is exposed out of the housing via the opening hole and configured to be connected to the device to be charged and a second position in which the connecting module is received in the housing;

a translation module, disposed on the lifting module, spaced apart from the connecting module, and capable of translating in the housing and movable up and down along with the lifting module; and a charging module, arranged on the translation module, configured to charge a device to be charged and capable of translating in the housing along with the translation of the charging module, wherein the connecting module is located at one side of the charging module facing away from the translation module, and wherein when the wireless charger is configured to charge a device, the connecting module is exposed out of the housing, the connecting module has an exposed surface, and the exposed surface is flush with an outer surface of the housing, and the charging module is received inside of the housing and is translated to align with a charging coil of the device.

* * * * *